United States Patent [19]

Smith, Jr. et al.

[11] Patent Number: 4,594,766
[45] Date of Patent: Jun. 17, 1986

[54] OPTICAL FIBER CABLES HAVING IMPROVED HERMETICITY

[75] Inventors: Warren F. Smith, Jr., Branford; Eugene Shapiro, Hamden; Joseph Winter, New Haven, all of Conn.

[73] Assignee: Olin Corporation, New Haven, Conn.

[21] Appl. No.: 705,246

[22] Filed: Feb. 25, 1985

[51] Int. Cl.$^4$ .............. B23P 19/04; G02B 6/44
[52] U.S. Cl. .................. 29/460; 350/96.23
[58] Field of Search ............ 350/96.23–96.25; 29/460

[56] References Cited

U.S. PATENT DOCUMENTS

| 4,089,585 | 5/1978 | Slaughter et al. | |
|---|---|---|---|
| 4,156,104 | 5/1979 | Mondello . | |
| 4,195,906 | 4/1980 | Dean et al. | |
| 4,278,835 | 7/1981 | Jackson . | |
| 4,349,243 | 9/1982 | Amano et al. | |
| 4,372,792 | 2/1983 | Dey et al. | |
| 4,390,589 | 6/1983 | Geyling et al. | |
| 4,437,729 | 3/1984 | Parfree et al. | 350/96.23 |
| 4,446,686 | 5/1984 | Panuska et al. | 350/96.23 |
| 4,477,147 | 10/1984 | Winter et al. | |
| 4,479,702 | 10/1984 | Pryor et al. | 350/96.23 |
| 4,508,423 | 4/1985 | Winter et al. | 350/96.23 |

FOREIGN PATENT DOCUMENTS 1585899 3/1981 United Kingdom .

OTHER PUBLICATIONS

"The Metal Coating of Optical Fibres" by R. Kompfner et al., *Applications of Quantum Electronics*, University of Oxford, Department of Engineering Science Report, 1975, pp. 54–78.

"Reductions in Static Fatigue of Silica Fibers" by D. A. Pinnow et al., *Applied Physics Filters*, vol. 34, No. 1, Jan., 1979, pp. 17–19.

"On Line-Metal Coating of Optical Fibres" by J. B. Almeida et al., *Optik*, vol. 53, No. 3, 1979, pp. 231–233.

*Primary Examiner*—Howard N. Goldberg
*Assistant Examiner*—Steven Nichols
*Attorney, Agent, or Firm*—Barry L. Kelmachter; Howard M. Cohn; Paul Weinstein

[57] ABSTRACT

The present invention relates to a process and apparatus for fabricating optical fiber cables having improved hermeticity. The optical fiber cables are formed by first reducing the water content of the buffer material surrounding each optical fiber. Thereafter, the dried optical fiber(s) are encapsulated into a metal or metal alloy tube. After fiber encapsulation, the tube may be sealed to prevent the ingress of moisture and/or water from the surrounding environment.

18 Claims, 3 Drawing Figures

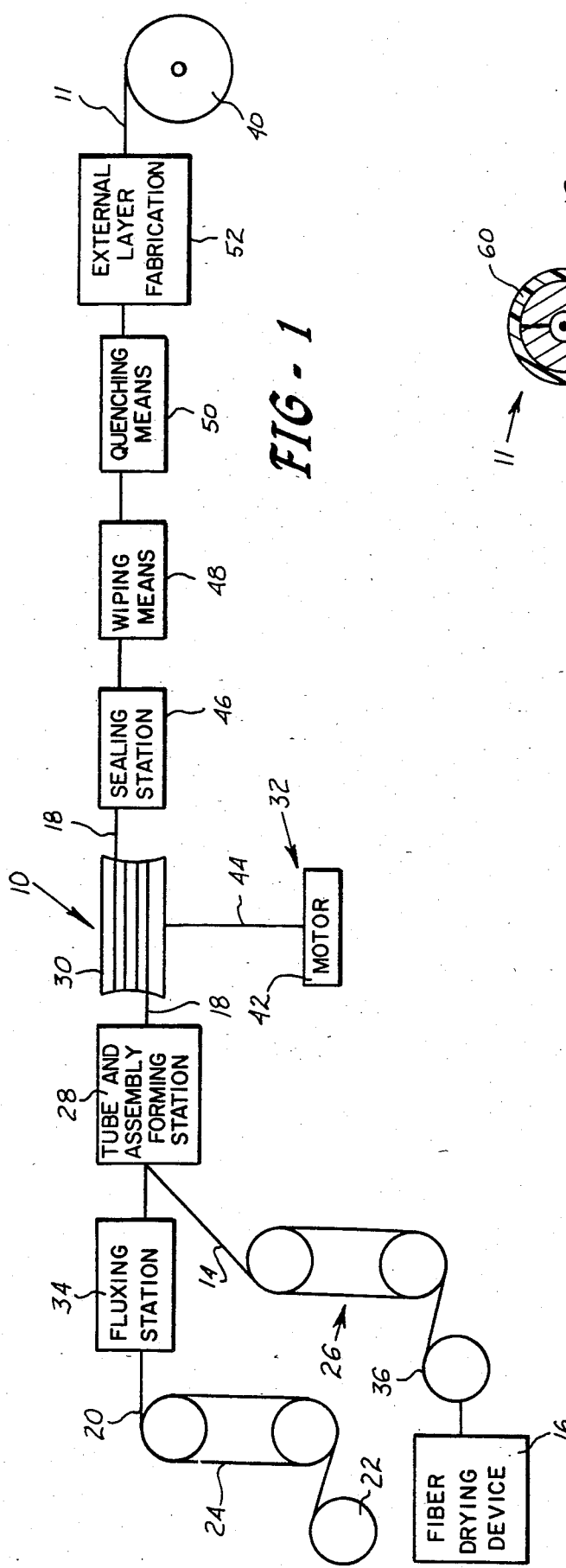
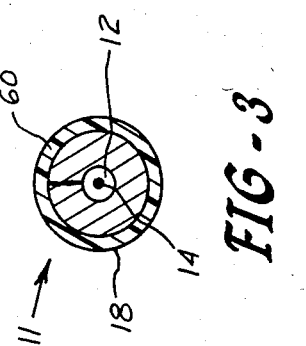
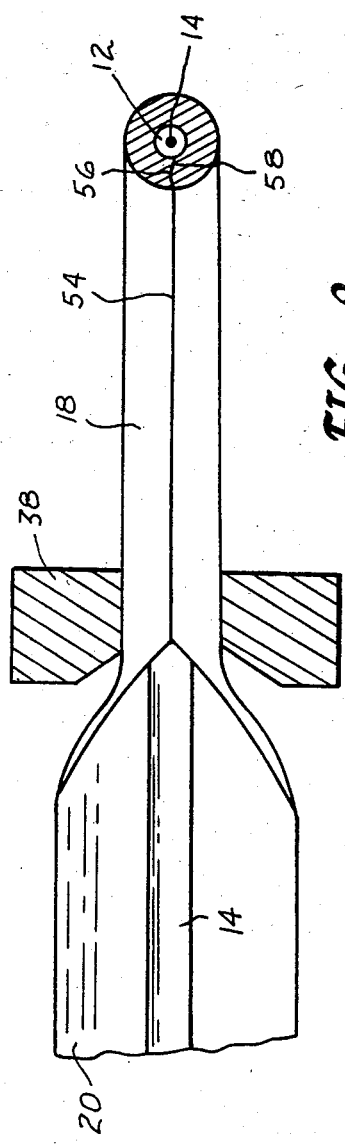

OPTICAL FIBER CABLES HAVING IMPROVED HERMETICITY

The present invention relates to the fabrication of optical fiber communication cables.

Hermeticity is a primary aspect of optical fiber cable performance. It is well documented in the art that water can adversely affect the physical and optical performance of optical fibers. For example, water vapor from the atmosphere can reduce the strength properties of optical fibers under stress by propagating large cracks from small microcracks existing on the surface of the optical fibers. Consequently, whether the final use for an optical fiber cable is an undersea application or an underground application, the cable is generally designed to have some mechanism for preventing the ingress of water and/or moisture from the surrounding environment.

Optical fiber cable designers uses several different devices to reduce the risk of water ingress and fiber degradation. These devices include surrounding the optical fiber or fibers with a grease-like water barrier and/or encapsulating the fiber(s) within one or more sealed tubular members. In the latter approach, the tubular members may be either metallic or non-metallic members or both. U.S. Pat. Nos. 4,195,906 to Dean et al., 4,278,835 to Jackson and 4,372,792 to Dey et al. illustrate optical fiber cable constructions having a water impermeable medium about the fiber(s). U.S. Pat. Nos. 4,089,585 to Slaughter et al., 4,156,104 to Mondello, 4,349,243 to Amano et al., and 4,477,147 to Winter et al. illustrate optical fiber cable constructions having one or more sealed tubes for providing hermeticity.

While these cable constructions focus on the prevention of water and moisture ingress, the techniques for forming them have generally ignored the problem of absorbed and adsorbed water within the buffer materials surrounding many optical fibers. Many buffer materials tend to be hygroscopic. As a result, water is absorbed and adsorbed from the surrounding environment during fiber storage and transport prior to encapsulation. Recent work has shown that a buffer material can be expected to contain water in equilibrium to its environment. Depending upon the environment, the water content can exceed 3% by weight. The presence of this much water gives rise to a significant potential for fiber degradation problems during cable service.

To prevent this absorption and adsorption of water from the surrounding environment, some optical fibers have been coated with a protective metal layer during the fiber fabrication process. By coating the fiber as part of the fiber fabrication technique, the amount of time that the unprotected fiber is exposed to the surrounding environment is significantly reduced. U.S. Pat. No. 4,390,589 to Geyling et al., U.K. Pat. No. 1,585,899 to Waddell, and the articles "The Metal Coating of Optical Fibres" by R. Kompfner et al., *Applications of Quantum Electronics*, University of Oxford, Department of Engineering Science Report, 1975, pp. 54–78, "Reductions in Static Fatigue of Silica Fibers by Hermetic Jacketing" by D. A. Pinnow et al., *Applied Physics Filters*, Vol. 34, No. 1, January, 1979, pp. 17–19, and "On Line-Metal Coating of Optical Fibres," by J. B. Almeida et al., *Optik*, Vol. 53, No. 3, 1979, pp. 231–233 illustrate some of the optical fiber coating techniques known in the art. One of the problems with this solution is that only relatively thin metal layers can be applied to the fiber. In fabricating hermetic optical fiber cables where the metal coating has to act as a strength layer as well as a hermetic layer, additional processing would be required to build up the metal coating thickness. As a result, there is some need for a simpler, alternative method for dealing with this problem while fabricating hermetic optical fiber cables.

Accordingly, it is an object of the present invention to provide an optical fiber cable construction having improved hermeticity.

It is a further object of the present invention to provide a process and apparatus for fabricating the above optical fiber cable construction.

It is still a further object of the present invention to provide a process and apparatus as above which includes a technique for reducing the water content of an optical fiber prior to fiber encapsulation.

These and further objects and advantages will become more apparent from the following description and drawings in which like reference numerals depict like elements.

In accordance with the present invention, a technique for encapsulating optical fibers in an essentially dry condition is provided. This technique includes means for reducing the water content in the buffer material surrounding the optical fiber before encapsulation of the fiber. By removing water from the buffer material before fiber encapsulation, a benign environment can be preserved about the fiber. Additionally, the risk of fiber degradation from the effects of water is significantly reduced.

The optical fiber cable fabrication technique of the present invention dries the optical fiber or fibers to be encapsulated in a suitable drying device such as a furnace prior to encapsulation. This drying step may be performed using either a dry atmosphere or a vacuum in the drying device. After drying, the fiber or fibers are encapsulated into a metal or metal alloy tube formed from a material having a desired set of strength and/or conductivity properties. Thereafter, the tube is coated with an appropriate sealing material to provide a sealed environment and protection against the ingress of water and/or moisture from the surrounding environment. If desired, one or more non-metallic layers may be fabricated about the tube to provide additional protection and/or strength.

FIG. 1 is a schematic representation of the optical fiber fabrication system of the present invention.

FIG. 2 is a cross sectional view of the tube forming apparatus used in the system of FIG. 1.

FIG. 3 is a cross sectional view of an optical fiber cable assembly formed in accordance with the present invention.

In accordance with the present invention, a process and apparatus for forming an optical fiber cable assembly containing at least one encapsulated buffered optical fiber and having improved hermeticity are provided. Buffered optical fibers generally consist of optical grade glass having an approximate diameter of 0.005" and one or more layers of a buffer material such as nylon, polyvinyl formal, fluoroethylenepropylene copolymers, polyetylene, other acrylic materials and a coating sold under the trademark HYTREL by duPont. As previously discussed, some of these buffer materials are hygroscopic in nature and pick up water from the surrounding environment. The process and apparatus of the present invention provide improved hermeticity by first reducing the water content of the buffer material surrounding the optical fiber and then encapsulating the essentially dry fiber or fibers in a braze sealed metal or metal alloy tube. By reducing the water content of the buffer material and encapsulating the fiber or fibers in an essentially dry condition, the risk of fiber degradation during cable service is significantly reduced.

Referring now to FIGS. 1 and 2, a system 10 for fabricating an optical fiber cable assembly 11 is illustrated. The optical fiber fabrication system 10 is essentially the same as the fabrication system shown in co-pending U.S. patent application Ser. No. 618,271, filed June 7, 1984, to Winter et al., which is hereby incorporated by reference. The present system differs from the Winter et al. system in that a means 16 for reducing the water content of a buffer material 12 surrounding an optical fiber 14 has been added. The water content reducing means 16 may comprise any suitable on-line or off-line drying device known in the art. Preferably, it comprises a device capable of drying an optical fiber while the fiber is wound on a spool or reel. For example, any suitable furnace known in the art may be used as the drying device 16.

Recent experimental work on the hygroscopic nature of buffer materials has shown that drying of the buffer material and fiber in the drying device 16 can be performed in either a dry atmosphere or a vacuum. The term "dry atmosphere" as used herein may be defined as an atmosphere having a dew point less than 0° F. The term "vacuum" as used herein may be defined as an atmosphere having a pressure greater than about 29 inches of Hg. When using a dry atmosphere in the drying device 16, good results may be obtained by drying the fiber at a temperature in the range of about 20° C. to about 100° C. for a time in the range of about 3 hours to about 60 hours. Preferably, drying is performed in an atmosphere having a dewpoint less than about −50° F. at a temperature from about 30° C. to about 60° C. for about 5 hours to about 50 hours.

When drying the fiber in a vacuum, drying may be carried out at a temperature in the range of about 20° C. to about 100° C. At these temperatures, suitable drying times are in the range of about 3 hours to about 100 hours. Preferably, vacuum drying is performed at a temperature in the range of about 20° C. to about 60° C. for a time in the range of about 5 hours to about 50 hours. When using vacuum drying at temperatures around about 20° C., protection should be taken to avoid freezing. If freezing occurs, drying will require unduly long times.

The foregoing drying parameters are affected by such factors as the tightness of the spool, the spool construction and the length of the optical fiber being dried and may have to be adjusted accordingly. It is also desirable to dry the fiber with a dynamic system such as a hot air circulating furnace than a static system.

After drying, the fiber 14 should be encapsulated within a metal or metal alloy tube 18 as rapidly as possible to prevent rehydration of the buffer material 12. Rehydration is a function of humidity and temperature and can occur quite rapidly under extreme conditions of high humidity and low temperature. In order to prevent rehydration during extended runs, the fiber is preferably payed out of the drying device 16 into the cable assembly apparatus.

In the present system, the metal or metal alloy encapsulation tube 18 is formed by paying off a length of metal or metal alloy tape 20 from a reel 22 and winding it about an accumulator or dancer 24. The accumulator 24 permits accumulation of a length of tape 20 sufficient to assure a substantially constant tape delivery rate to all downstream equipment. The accumulator 24 may comprise any conventional accumulator known in the art.

The tape 20 may be formed from any suitable ferrous and non-ferrous metal or metal alloy. Where strength and/or electrical conductivity are important, copper alloys such as alloys C15500, C19400, C19500, C63800 and C68800 and a high copper alloy containing zirconium produced by Olin Corporation and designated alloy 151 may be used. The tape 20 may have any desired cross sectional shape and hardness. For example, the tape 20 may have a rectangular or a trapezoidal cross sectional shape. For reasons to be discussed more fully hereinafter, it is also desirable that the tape 20 have a transverse cross sectional area which exceeds by about 5% to about 40%, preferably by about 8% to about 37%, the desired transverse cross sectional area for the tube 18.

After leaving the accumulator 24, the tape 20 is passed through a fluxing station 34 and into a tube forming and cable assembling station 28. The fluxing station 34 may comprise any suitable apparatus known in the art for applying a small amount of flux lubricant to that surface of the tape 20 which contacts the tube forming apparatus and forms the outer periphery of the tube 18. The flux lubricant primarily minimizes the friction created during the tube forming operation. In addition, it protects the surface forming the outer periphery of the tube 18 so that its solderability is not diminished. While any suitable flux lubricant known in the art may be used, it is preferred to use one that is water soluble. Water soluble lubricants are preferred because they can be easily removed during the final stages of processing.

Along with the tape 20, one or more optical fibers 14 to be encapsulated are fed into the tube forming and cable assembling station 28. Preferably, each optical fiber 14 to be encapsulated is payed off a reel 36 and wound about an accumulator or dancer 26. If desired, the reel 36 may be the same reel upon which the fiber 14 has been dried and may be located within the drying device 16. As discussed in the aforementioned Winter et al. application, the fiber accumulator 26 serves several important functions. First, it insures that there is sufficient slack in the optical fiber 14 to prevent the formation of kinks or snags that may seriously damage the optical fiber. Second, it insures that there is a sufficient supply of optical fiber 14 travelling along with the tape 20 and the tube 18. If needed, the accumulator 26 may apply a back tension to the fiber 14.

The tube forming and cable assembling station 28 may comprise any suitable apparatus known in the art for forming a tube 18 about the fiber or fibers 14. Preferably, it comprises one or more tube forming dies 38. The types of dies which may be used and the manner in which they are used are described in more detail in the aforementioned Winter et al. application and will not be described in detail here.

The force for pulling or drawing the tape 20 and the fiber or fibers 14 through the station 28 is preferably provided by a tensioning device 30 oriented to rotate about an axis transverse to the direction of travel of the tape 20 and the tube 18. The tensioning device 30 may comprise any conventional bull block or capstan known in the art. The tensioning device 30 may be driven by a suitable drive mechanism 32 such as a motor 42 and drive means 44. The drive means 44 may comprise belts, gears or the like. If desired, the drive mechanism 32 may be omitted.

The tensioning device 30 utilizes friction as the mechanical coupling between the tube 18 and itself. The amount of pull exerted on the tube is determined by the number of wraps of the tube around the tensioning device 30 and the exit tension applied to the tube 18 leaving the tensioning device 30 by the take-up reel 40. The number of tube wraps about the tensioning device 30 should be balanced to provide sufficient contact between the tube 18 and the tensioning device 30 while permitting some degree of transverse motion along the tensioning device.

The tube forming and cable assembly station as previously mentioned preferably comprises one or more tube forming dies 38. Using this type of tube forming approach, a tube 18 having a generally longitudinally extending seam 54 is formed. It is highly desirable from a hermeticity standpoint to have a pair of substantially non-linear, intermeshing edges 56 and 58 form the seam 54. The non-linear intermeshing edges improve hermeticity and seal strength by providing an increased surface area to which a sealing material can adhere. The use of a tape 20 having a transverse cross sectional area greater than the desired transverse tube cross sectional area permits this to be accomplished.

In addition to forming the substantially non-linear, intermeshing edges 56 and 58, the extra volume of metal in the tape 20 assists in forming a tube seam characterized by the absence of a well or notch at its outer periphery. It has also been discovered that the extra volume of metal shows up in the tube 18 essentially as longitudinal extension without any significant change in wall thickness. As a result, the total length of the tube 18 will be greater than the total length of the tape 20. The amount of extension in the tube 18 generally corresponds to the aforenoted percentage differentials in tape cross sectional area versus tube cross sectional area.

After leaving the tensioning device 30, the tube 18 is passed through a sealing station 46. The sealing station 46 may comprise any suitable means for sealing the tube and/or forming a coating about the tube. For example, it may be a bath of molten sealing material such as molten solder or molten brazing material through which the tube assembly is drawn. It may also be a wave soldering apparatus such as the one shown in the aformentioned Winter et al. application or the one shown in U.S. patent application Ser. No. 497,535, filed May 24, 1983, to Winter et al., which is also hereby incorporated by reference. In using any of these types of sealing devices, it is desirable to limit the exposure of the tube and fiber or fibers to the sealing material. Preferably, the tube and the fiber(s) are exposed to the sealing material for a relatively short time period, thereby minimizing the risk of damaging the encapsulated fiber or fibers 14. Exposure time can be controlled by using a relatively fast line speed.

Immediately after being sealed, the tube and fiber assembly may be passed through a wiping device 48 for removing any excess sealing material and a quenching means 50 for rapidly solidifying the sealing material. The wiping device 48 may comprise any suitable automatic or manual wiping device known in the art. The quenching means 50 may also comprise any suitable quenching system known in the art. For example, the quenching means 50 may comprise a water quenching arrangement in which the tube and fiber assembly pass through a wall of water. Alternatively, it may be an air quenching arrangement which blows air onto the sealed tube.

If desired, the cable assembly 11 may include one or more external layers 60 fabricated about the sealed tube 18. The type of layers that may be fabricated include strength layers such as those formed from a contrahelix or plastic filaments in a thermosetting epoxy matrix and dielectric and protective layers formed from suitable plastic materials such as polyethylene. One or more of these layers may assist in preventing the ingress of water and/or moisture from the surrounding environment. Any suitable means 52 known in the art may be used to fabricate the external layer or layers 60.

While the system of FIGS. 1 and 2 illustrates the encapsulation of a single optical fiber, more than one optical fiber may be encapsulated in the tube 18. If desired, the fibers may take the form of a preformed composite such as a rope of fibers. When inserting a plurality of individual fibers in to the tube 18, each fiber may be wound about its own accumulator arrangement.

While the system 10 is shown having a tensioning device 30, the device 30 may be omitted. When omitted, the force for pulling the tape 20 and the fiber or fibers 14 through the station 28 may be provided by the take-up reel 40.

While any suitable solder or brazing material known in the art may be used to seal and/or coat the tube 18, it is preferred to use a tin-containing sealing material.

While the fabrication of the external layer or layers has been illustrated as being done on-line, it may be done off-line if so desired.

The optical fiber cable produced by the present invention can be used in underground, above-ground and submarine communication applications. For example, it could be used to supply data support and power to a deep sea sensor. It could also be used for underground, above-ground and undersea telephone applications.

While the tape 20 preferably comprises a flat, continuous tape, a preformed tape, e.g. a tape having a preformed U-shaped configuration, could also be used.

The U.S. patent and patent applications, the foreign patent publications and the other publications set forth in the specification are intended to be incorporated by reference herein.

It is apparent that there has been provided in accordance with this invention optical fiber cables having improved hermeticity which fully satisfy the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A process for fabricating an optical fiber communication cable, said process comprising:
   providing at least one optical fiber having a buffer material;
   drying each said optical fiber so as to reduce the water content of said buffer material; and
   encapsulating said at least one optical fiber in a metal or metal alloy tube.

2. The process of claim 1 wherein said encapsulating step comprises:
   providing a continuous length metal or metal alloy strip and at least one tube forming die;

pulling said strip through said at least one die to form said tube; and inserting said at least one fiber into said forming tube.

3. The process of claim 2 further comprising:

sealing said tube to provide a hermetic assembly.

4. The process of claim 3 wherein said sealing step comprises:

passing said tube and said at least one encapsulated fiber through a molten sealing material to form a thin, substantially uniform coating about said tube.

5. The process of claim 3 further comprising:

forming at least one non-metallic layer about said tube after said sealing step.

6. A process for fabricating an optical fiber communication cable, said process comprising:

providing at least one optical fiber having a buffer material;

drying each said optical fiber in an atmosphere having a dew point less than about 0° F. at a temperature in the range of about 20° C. to about 100° C. for a time in the range of about 3 hours to about 60 hours; and encapsulating said at least one optical fiber in a metal or metal alloy tube.

7. A process for fabricating an optical fiber communication cable, said process comprising:

providing at least one optical fiber having a buffer material;

drying each said optical fiber in a vacuum at a temperature in the range of about 20° C. to about 100° C. for a time in the range of about 3 hours to about 100 hours; and encapsulating said at least one optical fiber in a metal or metal alloy tube.

8. A process for fabricating an optical fiber communication cable, said process comprising:

providing at least one optical fiber having a buffer material;

drying each said optical fiber in a furnace having a vacuum at a temperature in the range of about 20° C. to about 60° C. for a time period in the range of about 5 hours to about 50 hours; and encapsulating said at least one optical fiber in a metal or metal alloy tube.

9. A process for fabricating an optical fiber communication cable, said process comprising:

providing at least one optical fiber having a buffer material;

drying each said optical fiber in a furnace having an atmosphere with a dewpoint less than about $-50°$ F. at a temperature in the range of about 30° C. to about 60° C. for about 5 hours to about 50 hours; and encapsulating said at least one optical fiber in a metal or metal alloy tube.

10. An apparatus for fabricating an optical fiber communication cable, said apparatus comprising:

means for subjecting at least one optical fiber having a buffer material to a drying treatment for reducing the water content of said buffer material; and means for encapsulating said at least one optical fiber into a metal or metal alloy tube after said treatment.

11. The apparatus of claim 10 further comprising:

said encapsulating means including at least one die for forming a continuous length of metal or metal alloy strip into said tube; and means for inserting said at least one dried optical fiber into said forming tube.

12. The apparatus of claim 11 further comprising:

means for sealing said tube to provide a hermetic assembly.

13. The apparatus of claim 12 wherein said sealing means comprises a bath of molten sealing material through which said tube and said at least one encapsulated fiber are drawn.

14. The apparatus of claim 12 wherein said sealing means comprises a wave soldering apparatus.

15. The apparatus of claim 12 further comprising:

means for fabricating at least one external layer about said tube.

16. The apparatus of claim 12 wherein said encapsulating means further comprises:

means for applying a tensile force to said strip and said at least one fiber to pull said strip and said at least one fiber through said at least one die.

17. The apparatus of claim 10 wherein said water content reducing means comprises a fiber drying device.

18. The apparatus of claim 17 wherein said drying device comprises a furnace.

* * * * *